(12) United States Patent
Liew

(10) Patent No.: US 9,162,767 B2
(45) Date of Patent: Oct. 20, 2015

(54) AIRCRAFT PASSENGER SEAT DEVICE

(71) Applicant: RECARO Aircraft Seating GmbH & Co. KG., Schwabisch Hall, DE (US)

(72) Inventor: Chee Meng Liew, Richardson, TX (US)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 14/075,476

(22) Filed: Nov. 8, 2013

(65) Prior Publication Data
US 2015/0130249 A1    May 14, 2015

(51) Int. Cl.
*A47B 83/02*    (2006.01)
*B64D 11/06*    (2006.01)

(52) U.S. Cl.
CPC ...................................... *B64D 11/06* (2013.01)

(58) Field of Classification Search
CPC .................................. B64D 11/06; G09F 7/18
USPC ............ 297/148, 149, 150, 151, 153, 411.32; 40/320, 606.08, 727
See application file for complete search history.

(56) References Cited

U.S. PATENT DOCUMENTS

| | | | | |
|---|---|---|---|---|
| 382,687 A * | 5/1888 | Burlin | | 297/153 |
| 1,182,938 A * | 5/1916 | Snideman | | 297/153 |
| 1,223,543 A * | 4/1917 | Wedge | | 297/153 |
| 1,689,070 A * | 10/1928 | Elliott | | 40/666 |
| 2,125,488 A * | 8/1938 | Colie | | 40/320 |
| 2,394,141 A * | 2/1946 | Braden | | 297/151 |
| 2,563,347 A * | 8/1951 | Long | | 297/149 |
| 2,720,913 A * | 10/1955 | Hoppert | | 297/149 |
| 3,083,053 A * | 3/1963 | Dorsey | | 297/153 |
| 3,121,591 A * | 2/1964 | Micciche | | 297/153 |
| 3,283,433 A * | 11/1966 | Navarino | | 40/320 |
| 3,475,052 A * | 10/1969 | Kaposi | | 297/153 |
| 3,606,449 A * | 9/1971 | Whybrew et al. | | 297/153 X |
| 3,702,034 A * | 11/1972 | Pfeiffer | | 40/320 |
| 3,833,257 A * | 9/1974 | Dove | | 297/284.1 |
| 4,512,607 A * | 4/1985 | Rapp | | 297/153 |
| 4,659,099 A * | 4/1987 | Malone | | 297/153 X |
| 4,867,506 A * | 9/1989 | Chavez | | 297/153 X |
| 5,462,005 A * | 10/1995 | Finger | | 40/320 X |
| 6,354,658 B1 * | 3/2002 | Sher et al. | | 297/148 X |
| 6,604,786 B1 * | 8/2003 | Benden et al. | | 297/153 X |
| 6,773,060 B2 * | 8/2004 | Sher et al. | | 297/148 X |
| 6,776,457 B2 * | 8/2004 | Muin et al. | | 297/411.32 X |
| 6,935,683 B1 * | 8/2005 | Brown | | 297/153 X |
| 7,131,225 B2 * | 11/2006 | Wu | | 40/320 |
| 7,261,369 B2 * | 8/2007 | Ahad | | 297/148 |
| 7,458,643 B2 * | 12/2008 | Johnson | | 297/411.32 X |
| 7,506,923 B1 * | 3/2009 | Gauss | | 297/150 |
| 7,905,040 B2 * | 3/2011 | Alterman | | 40/320 |
| 8,070,233 B2 * | 12/2011 | Schumacher et al. | ... | 297/411.32 |
| 8,079,553 B1 * | 12/2011 | Martin | | 297/153 X |
| 8,347,791 B1 * | 1/2013 | Gray et al. | | 297/150 X |
| 8,534,761 B2 * | 9/2013 | Saxton | | 297/411.32 |
| 8,590,854 B1 * | 11/2013 | Salazar | | 297/153 X |

(Continued)

*Primary Examiner* — Rodney B White
(74) *Attorney, Agent, or Firm* — Posz Law Group, PLC

(57) ABSTRACT

An aircraft passenger seat device comprises an aircraft passenger seat with at least one armrest element which is provided for delimiting a seating area of the aircraft passenger seat, and a seat blocking device which is provided for blocking a seating area of the aircraft passenger seat in a mounted state. The seat blocking device is designed to be connected to the at least one armrest element by a toolless form fit.

19 Claims, 6 Drawing Sheets

(56) References Cited

U.S. PATENT DOCUMENTS

Figure 1:
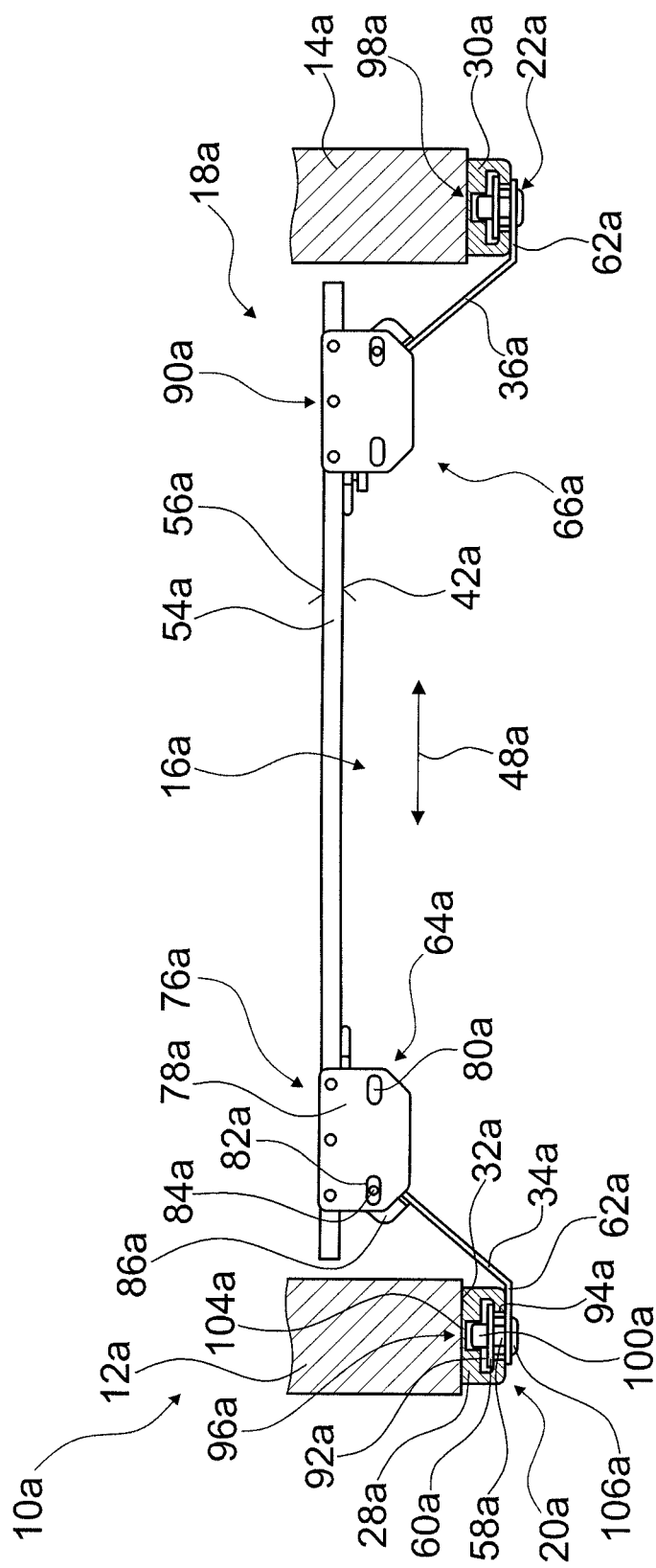

| | | | |
|---|---|---|---|
| 8,783,765 B1 * | 7/2014 | Matus et al. | 297/152 |
| 8,857,911 B2 * | 10/2014 | Aguirre et al. | 297/411.45 |
| 8,931,846 B2 * | 1/2015 | Merensky | 297/411.32 X |
| 8,931,847 B2 * | 1/2015 | Cailleteau et al. | 297/411.32 |
| 2006/0202523 A1 * | 9/2006 | Wells | 297/148 |
| 2009/0224577 A1 * | 9/2009 | Chen | 297/153 |
| 2014/0333100 A1 * | 11/2014 | Wilkens | 297/411.32 X |

* cited by examiner

AIRCRAFT PASSENGER SEAT DEVICE

PRIOR ART

The invention relates to an aircraft passenger seat device having an aircraft passenger seat with at least one armrest element which is provided for delimiting a seating area of the aircraft passenger seat.

An aircraft passenger seat device comprising an aircraft passenger seat with at least one armrest element which is provided for delimiting a seating area of the aircraft passenger seat, and comprising a seat blocking device which is provided for blocking a seating area of the aircraft passenger seat in a mounted state has already been proposed.

The objective of the invention is, in particular, to provide a generic device with improved properties regarding handling and assembling. According to the invention, the objective is achieved by the features of Patent Claim 1, while advantageous embodiments and developments of the invention may be found in the subclaims.

SUMMARY OF THE INVENTION

The invention relates to an aircraft passenger seat device comprising an aircraft passenger seat with at least one armrest element which is provided for delimiting a seating area of the aircraft passenger seat, and comprising a seat blocking device which is provided for blocking a seating area of the aircraft passenger seat in a mounted state.

It is proposed that the seat blocking device is designed to be connected to the at least one armrest element by a tool-less form fit. The term "aircraft passenger seat" is intended, in particular, to mean a seat that is mounted into an aircraft, wherein the aircraft passenger seat is preferably part of a seat row in which two or advantageously at least three aircraft passenger seats are connected to a row. The term "armrest element" is intended, in particular, to mean an element a passenger sitting on the aircraft passenger seat can rest his or her arms on. Herein the aircraft passenger seat advantageously has two armrest elements that delimit a seating area the passenger sits on. Two neighboring aircraft passenger seats of a seat row preferable share one armrest element. The word "provided" is intended, in particular, to mean specifically designed and/or equipped.

The term "seat blocking device" is intended, in particular, to mean a device that is provided for blocking and closing off an aircraft passenger seat and thereby preventing people from sitting on the closed-off aircraft passenger seat. The seat blocking device is herein intended to provide a table area for people sitting in neighboring aircraft passenger seats. The seat blocking device is intended to be mounted onto an aircraft passenger seat by an airplane crew, for example in a case when a single person has booked two neighboring aircraft passenger seats for himself or a couple has booked a whole seat row comprising three seats, with the middle aircraft passenger seat being blocked off. The term "mounted state" is intended, in particular, to mean a state in which the seat blocking device is fully mounted onto the aircraft passenger seat via the respective armrest elements of the aircraft passenger seat. The wording "designed to be" is intended, in particular, to mean specifically designed, constructed and/or meant for a certain purpose. The term "form fit" is intended, in particular, to mean a connection by which at least two members, in particular form fit members, are connected to one another by a positive locking. The term "toolless form fit" is intended, in particular, to mean a form fit between two elements that can be established by using one's hands only. In particular a toolless form fit is a form fit that can be established without using any kind of tooling besides one's hands. By means of an embodiment according to the invention, it is possible to block off an aircraft passenger seat advantageously easily by hand. The seat blocking device can be easily mounted to the aircraft passenger seat by easily connecting the seat blocking device via a form fit to the armrest elements by a single person.

Furthermore the seat blocking device is designed to be connected to the at least one armrest element by a screw-less form fit. The term "screw-less form fit" is intended, in particular, to mean a form fit that is established without requiring any element that has a thread such as a screw, a nut and/or a threaded pin. Hence the assembly process for mounting the seat blocking device onto the at least one armrest element is advantageously easy and fast, since there are no screws to be tightened.

In addition the seat blocking device has at least one form fit member which is designed to be connected to a correspondent form fit member of the aircraft passenger seat. The term "form fit member" is intended, in particular, to mean a member that is intended to be connected to a respective form fit member via a form fit to establish a form fit connection between at least two elements that are to be connected. Hence it is advantageously possible to connect the seat blocking device easily to the aircraft passenger seat.

Moreover the at least one armrest element comprises at least one form fit member which is designed to connect the seat blocking device to the aircraft passenger seat and is implemented as a guiding member. The term "guiding member" is intended, in particular, to mean a member that has a guiding surface which guides another form fit member which engages with the form fit member that is implemented as a guiding member. The at least one form fit member of the armrest element can thereby be located at an upper side, an underside or a lateral side of the armrest element. Hence the form fit member is advantageously designed to allow an easy mounting process to connect the seat blocking device to the armrest element. A Additionally the at least one form fit member of the at least one armrest element is located at an underside of the armrest element. The term "underside of the armrest element" is intended, in particular, to mean a side of the armrest element that faces a seat bottom of the aircraft passenger seat, in a usage position of the armrest element, in which the armrest element delimits a seating area and is oriented essentially parallel to a seat bottom of the aircraft passenger seat. Hence it is possible to position the form fit member of the armrest element in an advantageous area where it is not noticeable by a passenger and is not bothersome to the passenger.

In a preferred embodiment the at least one form fit member of the at least one armrest element has a locking direction which is oriented parallel to a main extension of the at least one armrest element. The term "locking direction" is intended, in particular, to mean a direction in which the two form fit members that are to be connected have to be moved relative to one another to establish a form fit connection. Hence a mounting of the seat blocking device on the at least one armrest element can be achieved by an advantageously easy mounting process.

In addition the at least one form fit member of the at least one armrest element has a locking direction which is oriented transversely to a main extension of the at least one armrest element. Hence it is advantageously possible to provide a form fit connection that easily prevents the seat blocking device from slipping out of it, whereby an advantageously safe form fit connection is provided.

In addition the seat blocking device has at least one support member by which the seat blocking device is connected to the at least one armrest element. The term "support member" is intended, in particular, to mean a member that is able to bear loads and transmit forces from one element which it is affixed to another element it is affixed to. In particular the support member is intended to transfer forces that are introduced into the seat blocking device, in particular into a main body of the seat blocking device, to the aircraft passenger seat, in particular an armrest element or a seat bottom. The forces that are introduced into the seat blocking device are forces that occur during usage of the seat blocking device, for example from elements that are placed on the seat blocking device or a person that leans on the seat blocking device. Hence the seat blocking device is advantageously simply connected to the aircraft passenger seat.

Furthermore, the at least one support member is connected to the seat blocking device by a form fit. Hence it is advantageously possible to affix the support member to the seat blocking device easily.

Additionally the seat blocking device has at least one hinge that pivotably connects the at least one support member to an underside of the seat blocking device. Hence it is advantageously possible to arrange the support member in different positions, especially a storage position in which the seat blocking device is advantageously compact and thus can easily be stored.

Moreover the at least one armrest element has a surface which itself forms a form fit member by means of which the seat blocking device is connected to the at least one armrest element. Hence it is advantageously possible that the armrest element itself can be used to connect the seat blocking device via a form fit and no further elements are needed, thus an embodiment with advantageously few elements is provided.

In another embodiment the seat blocking device consists of at least two elements which are pivotably connected to one another. Hence it is advantageously possible to fold the seat blocking device into a state where it is compact and thus needs only little storage space.

Furthermore, the at least two elements of the seat blocking device are folded against each other in a storage position and are designed to be pivoted into a usage position, in which they are oriented essentially parallel to one another, in an assembly process. Hence an advantageous seat blocking device can be provided that is advantageously compact in a storage position while being advantageously big in a usage position.

It is not intended to restrict the aircraft passenger seat device according to the invention to the use and embodiment described above. In particular, the aircraft passenger seat device according to the invention can have a different number of individual elements, components and units from that mentioned herein in order to perform a function described herein.

DRAWINGS

Further advantages will become apparent from the following description of the drawings. In the drawings, illustrative embodiments of the invention are shown. The drawings, the description and the claims contain numerous features in combination. A person skilled in the art will expediently also consider the features individually and combine them into appropriate further combinations.

Figure 2:
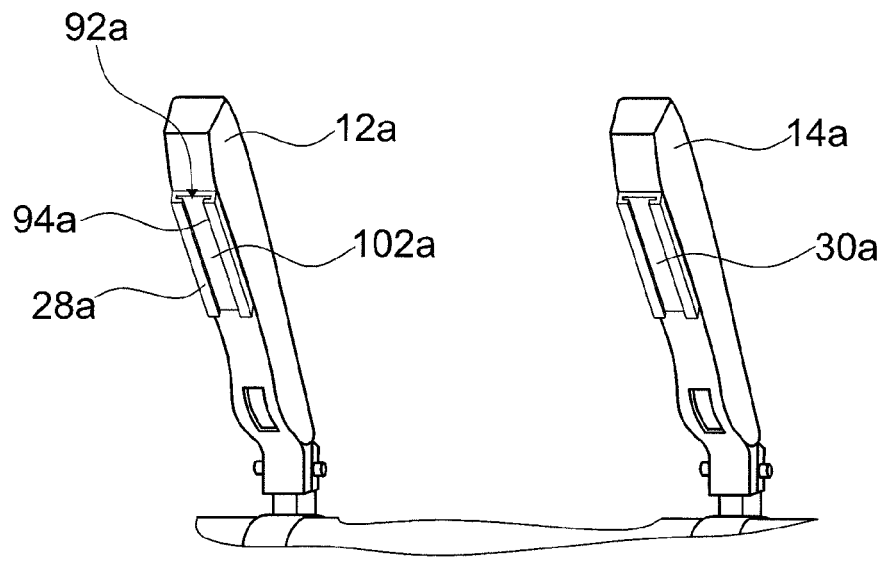
Figure 3:
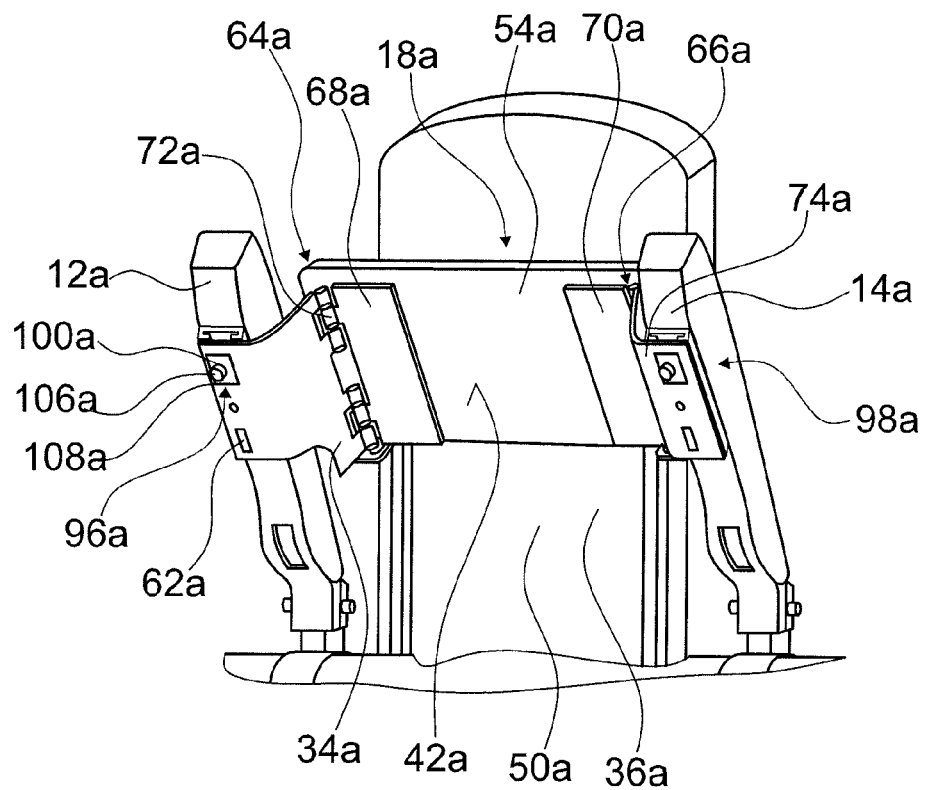
Figure 4:
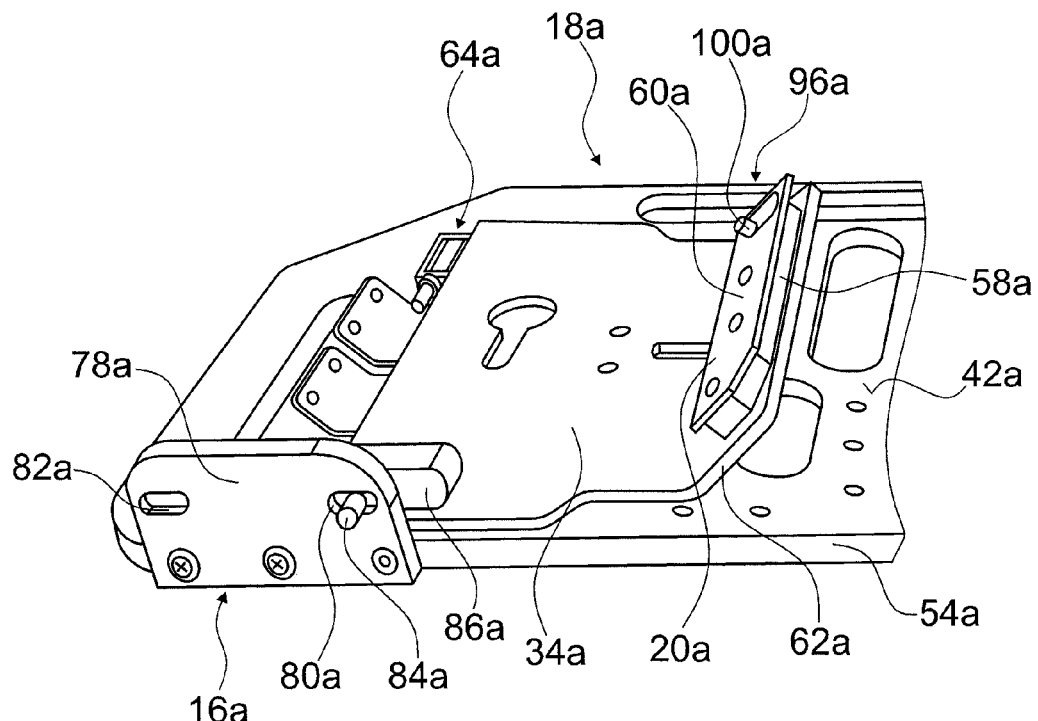
Figure 5:
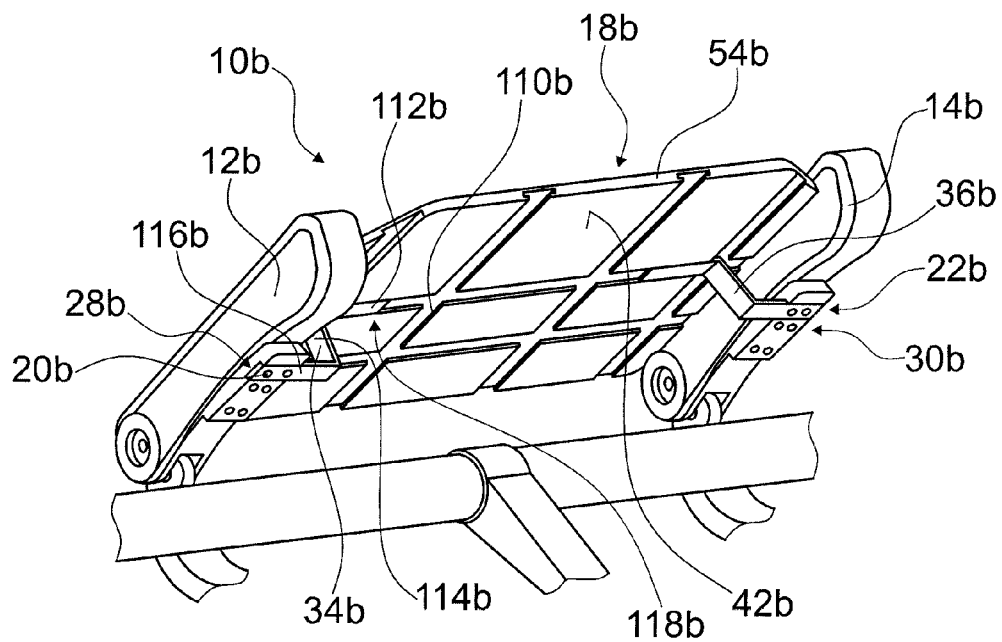
Figure 6:
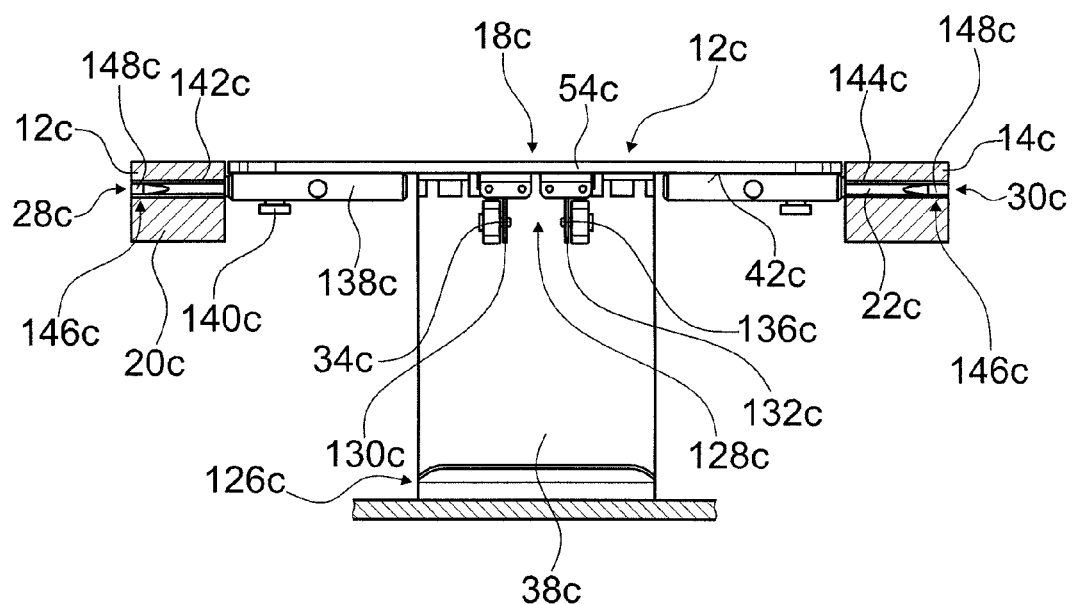
Figure 7:
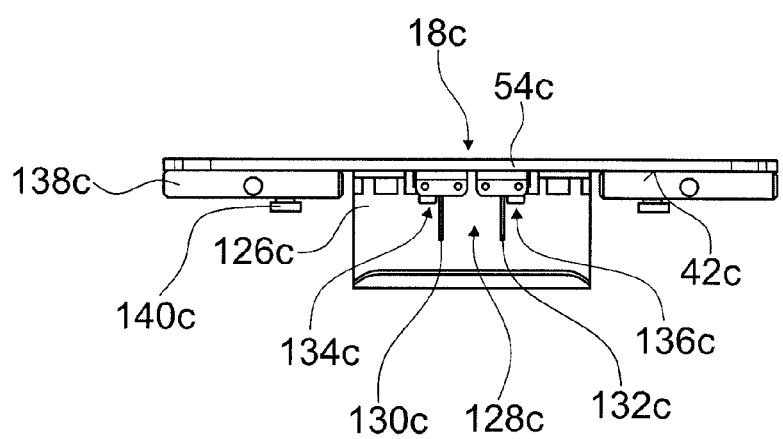
Figure 8:
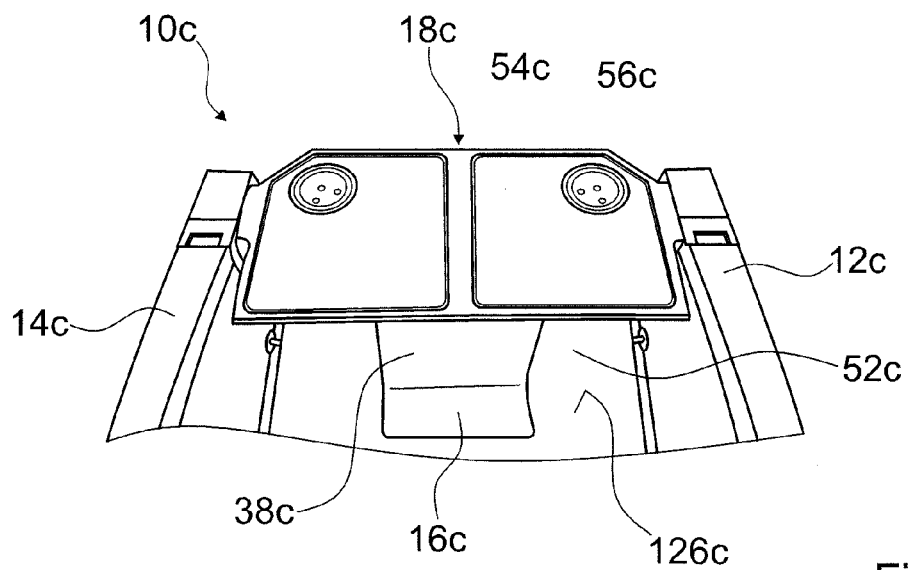
Figure 9:
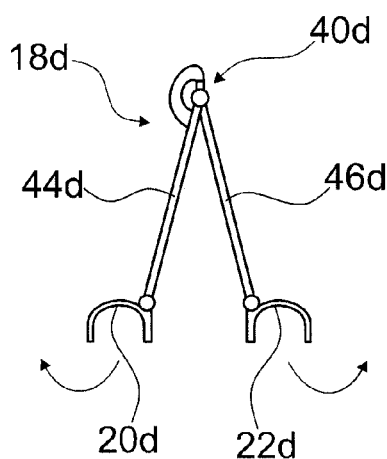
Figure 10:
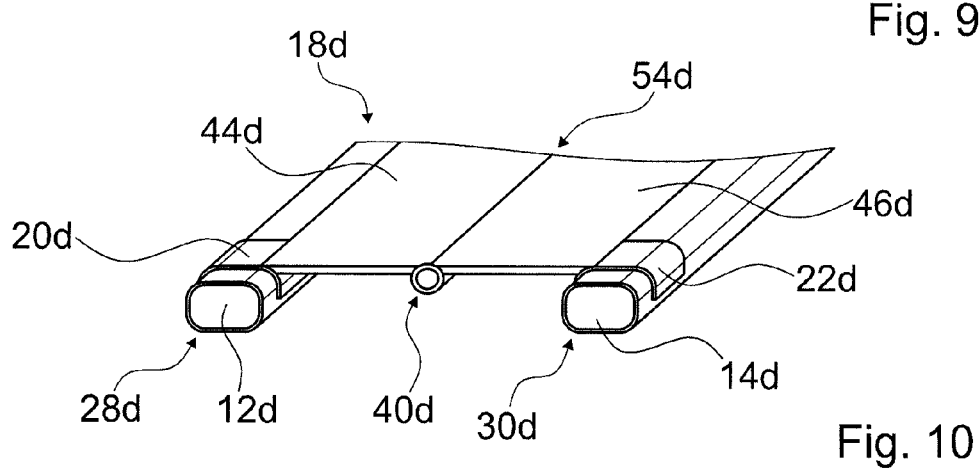
Figure 11:
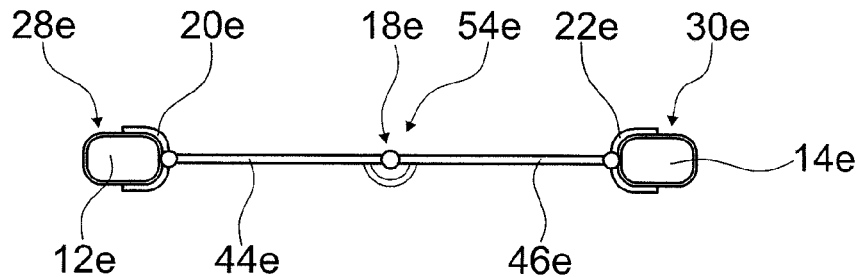
Figure 12:
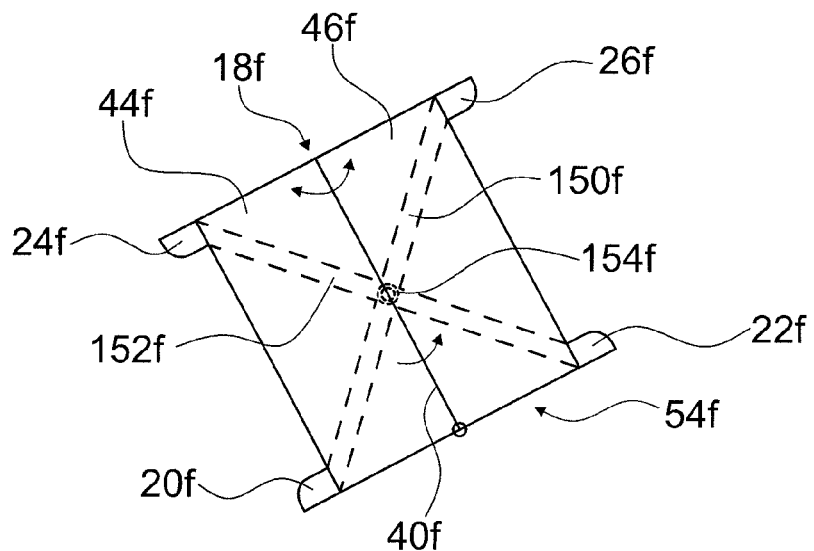
Figure 13:
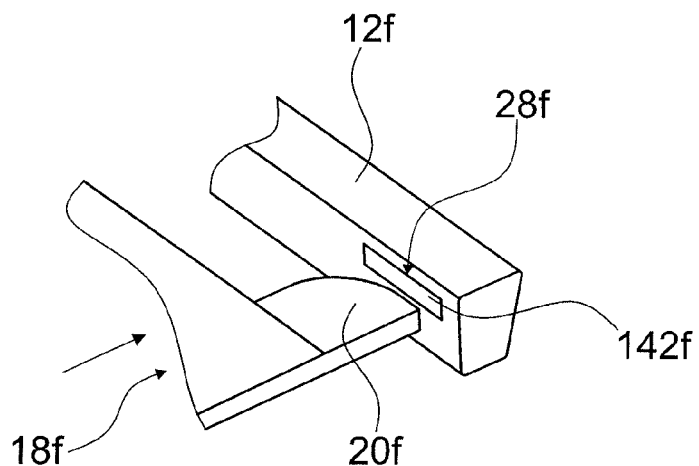

In the drawings:

FIG. 1 shows a section view of an inventive aircraft passenger seat device in an first embodiment with a seat blocking device and two armrest elements, FIG. 2 shows a schematic view of a portion of an aircraft passenger seat with two armrest elements, FIG. 3 shows a schematic view of the aircraft passenger seat device, with the seat blocking device that is mounted to the two armrest elements, FIG. 4 shows a detail view of the seat blocking device with a locking unit that locks support members of the seat blocking device in different positions, FIG. 5 shows a schematic view of an inventive aircraft passenger seat device in a second embodiment with a seat blocking device and two armrest elements, FIG. 6 shows a section view of an inventive aircraft passenger seat device in a third embodiment with a seat blocking device and two armrest elements, FIG. 7 shows a schematic view of the seat blocking device of FIG. 6 in a storage position, FIG. 8 shows a schematic view of the aircraft passenger seat device of FIG. 6 with the seat blocking device that is mounted to the two armrest elements, FIG. 9 shows a highly simplified schematic view of an inventive aircraft passenger seat device in a fourth embodiment with a seat blocking device, FIG. 10 shows a highly simplified schematic view of the aircraft passenger seat device of FIG. 9 with two armrest elements and the seat blocking device mounted thereto, FIG. 11 shows a highly simplified schematic view of an inventive aircraft passenger seat device in a fifth embodiment with a seat blocking device, FIG. 12 shows a highly simplified schematic view of an inventive aircraft passenger seat device in a sixth embodiment with a seat blocking device and FIG. 13 a highly simplified section view of the inventive aircraft passenger seat device in the sixth embodiment with a portion of a seat blocking device and a portion of an armrest element.

DESCRIPTION OF THE ILLUSTRATIVE EMBODIMENTS

FIGS. 1 to 4 show a first embodiment of an inventive aircraft passenger seat device. The aircraft passenger seat device comprises an aircraft passenger seat 10a which is only partly shown. The aircraft passenger seat 10a is part of an airplane which is not further illustrated. The aircraft passenger seat 10a is furthermore part of a seat row, in which three aircraft passenger seats 10a are connected to one another in a row. The aircraft passenger seat 10a is placed in between the two further aircraft passenger seats 10a. In principle it is also thinkable that a seat row in which the aircraft passenger seat 10a is arranged comprises more than three or less than three aircraft passenger seats 10a. It is also thinkable that the aircraft passenger seat 10a is placed beside only one further aircraft passenger seat 10a. The aircraft passenger seat 10a comprises two armrest elements 12a, 14a. The armrest elements 12a, 14a are provided to delimit a seating area 16a of the aircraft passenger seat 10a. The armrest elements 12a, 14a delimit the seating area 16a of the aircraft passenger seat 10a in a lateral direction 48a. The two armrest elements 12a, 14a are each arranged at a respective side of the seating area 16a. The armrest elements 12a, 14a separate the aircraft passenger seat 10a from the neighboring aircraft passenger seat 10a of the same seat row. The armrest elements 12a, 14a separate the seating area 16a of the aircraft passenger seat 10a from seating areas of the neighboring aircraft passenger seats 10a. The aircraft passenger seat 10a comprises a backrest 50a and a seat bottom 52a. The seat bottom 52a forms the seating area of the aircraft passenger seat 10a. The aircraft passenger seat 10a has a basic structure which is not shown in detail. The basic structure is provided so that other elements of the aircraft passenger seat 10a can be mounted onto it, in particular the backrest 50a and the seat bottom 52a. The armrest elements 12a, 14a are arranged to be pivotable with respect to the backrest 50a. The armrest elements 12a, 14a are connected to the basic structure of the aircraft passenger seat 10a by means of a hinge which is not shown in detail. The armrest elements 12a, 14a have a usage position and a fold-up position. Herein the armrest elements 12a, 14a are fixable in the usage position by a locking unit (not shown in detail). In the usage position the armrest elements 12a, 14a are oriented essentially parallel to the seat bottom 52a. In the usage position the armrest elements 12a, 14a delimit the seating area 16a of the respective aircraft passenger seat 10a. In the fold-up position the armrest elements 12a, 14a are oriented perpendicularly to the seat bottom 52a and are arranged in a space between the backrest 50a of the aircraft passenger seat 10a and a backrest of a respective neighboring aircraft passenger seat 10a. In the fold-up position, the armrest elements 12a, 14a are moved out of a direct path between the seating area 16a of the aircraft passenger seat 10a and the seating area of a respective neighboring aircraft passenger seat 10a. In the fold-up position of the armrest element 12a, 14a an underside 32a of the armrest element 12a, 14a is oriented towards the front of the aircraft passenger seat 10a.

The aircraft passenger seat device comprises a seat blocking device 18a. The seat blocking device 18a is provided for blocking the seating area 16a of the passenger seat. In a mounted state the seat blocking device 18a blocks the seating area 16a of the respective aircraft passenger seat 10a. The seat blocking device 18a is designed to make the respective aircraft passenger seat 10a it is mounted on unusable for a passenger to sit on. If the seat blocking device 18a is mounted on the aircraft passenger seat 10a, a passenger cannot sit on the seating area 16a of the aircraft passenger seat 10a. The seat blocking device 18a has a main body 54a which is provided to be placed above the seating area 16a of the aircraft passenger seat 10a to block off said seating area 16a of the aircraft passenger seat 10a. The main body 54a is embodied as a rectangular box. The main body 54a is composed of aluminum. In general it is also thinkable that the main body 54a is composed of a plastic material, of a composite material, such as a fiber-reinforced plastic, or of another metal, preferably a light metal, such as for example titanium. In a mounted state the main body 54a of the seat blocking device 18a extends almost completely from one armrest element 12a to the other armrest element 14a delimiting the seating area 16a. In the lateral direction 48a the main body 54a of the seat blocking device 18a spans the seating area 16a of the aircraft passenger seat 10a almost entirely. In a seating direction, which is oriented transversely to the lateral direction 48a and substantially orthogonally to the backrest 50a, the main body 54a of the seat blocking device 18a spans the seating area 16a only in part. Herein the main body 54a spans the seating area 16a of the aircraft passenger seat 10a in the seating direction by more than 50%. In general it is also conceivable that the main body 54a spans the seating area 16a of the aircraft passenger seat 10a in the seating direction or the lateral direction 48a by other percentages the person skilled in the art may find expedient. Preferably the dimensions of the main body 54a are implemented such that the main body 54a spans most of the seating area 16a in a mounted state yet is not too big to be stored in storage facilities in the aircraft. On a top side the main body 54a of the seat blocking device 18a forms a table area 56a. The top side of the main body 54a faces, in a state mounted to the aircraft passenger seat 10a, away from the seat bottom 52a. The table area 56a is an in general flat plane, which is provided so that objects can be placed on it. The table area 56a may have indentations which are provided for placing beverage containers such as cups or cans safely on the table area 56a. A design of the table area 56a of the main body 54a is not further elaborated. The table area 56a of the main body 54a can be designed in any shape or form a person skilled in the art would consider preferable.

The seat blocking device 18a is designed to be connected to the armrest elements 12a, 14a by a toolless form fit. To connect the seat blocking device 18a to the armrest elements 12a, 14a, no tools are required. A person, especially a crew member, is able to fix the seat blocking device 18a to the armrest elements 12a, 14a that delimit the aircraft passenger seat 10a, by using his or her hands only. No tool is necessary for mounting the seat blocking device 18a to the respective armrest elements 12a, 14a. A positive fit captively connects the seat blocking device 18a and the respective armrest elements 12a, 14a. The seat blocking device 18a is designed to be connected to the at least one armrest element 12a, 14a by a screw-less form fit. A form fit connection between the seat blocking device 18a and the respective armrest element 12a, 14a is achieved without usage of a screw or another element that has a thread for connection, such as a nut or a threaded pin.

For connecting the seat blocking device 18a to the armrest elements 12a, 14a delimiting the seating area 16a the seat blocking device 18a is to block, the seat blocking device 18a has two form fit members 20a, 22a. To connect the seat blocking device 18a via a form fit to the armrest elements 12a, 14a, each armrest element 12a, 14a comprises a form fit member 28a, 30a which is implemented correspondent to the respective form fit member 20a, 22a of the seat blocking device 18a. The form fit members 20a, 22a of the seat blocking device 18a are constructed as rail elements. Each form fit member 20a, 22a of the seat blocking device 18a has a slim part 58a and a wide part 60a. The slim part 58a and the wide part 60a of a form fit member 20a, 22a are built as a one-piece element. The wide part 60a of the form fit member 20a, 22a is oriented, in a mounted state, towards the armrest element 12a, 14a and the respective form fit member 28a, 30a of the armrest element 12a, 14a. In a mounted state, the slim part 58a of the form fit member 20a, 22a is located on a side of the wide part 60a of the form fit member 20a, 22a, which faces away from the armrest element 12a, 14a and the respective form fit member 28a, 30a of the armrest element 12a, 14a. Herein a respective form fit member 28a, 30a of the armrest element 12a, 14a can enclose the wide part 60a of the form fit member 20a, 22a and thus create a positive fit with the respective form fit member 20a. 22a of the seat blocking device 18a.

To connect the main body 54a to the armrest elements 12a, 14a, the seat blocking device 18a has two support members 34a, 36a. By these support members 34a, 36a the seat blocking device 18a is connected to the armrest elements 12a, 14a. The support members 34a, 36a are embodied as support arms. The support members 34a, 36a are provided to connect the main body 54a of the seat blocking device 18a with the form fit members 20a, 22a of the seat blocking device 18a. The first support member 34a is arranged at a first lateral side of the main body 54a, which faces the one armrest element 12a. The second support member 36a is arranged at a second lateral side of the main body 54a, which faces the other armrest element 14a.

Hereinafter just one support member 34a, 36a of the seat blocking device 18a is described. The following description applies to the other support member 34a, 36a of the seat blocking device 18a as well. For better understanding, reference numerals for both support members 34a, 36a are added in the description below. The support member 34a, 36a is formed as a plate, which features a bent-off flap 62a at a first end. In a mounted state the bent-off flap 62a is oriented essentially parallel to the table area 56a. The one form fit member 20a, 22a is mounted on the bent off flap 62a of the support member 34a, 36a. Herein the form fit member 20a, 22a is mounted on a side of the bent off flap 62a which faces the respective armrest element 12a, 14a the form fit member 20a, 22a is connected to. On a second end the support member 34a, 36a that is formed as a plate is connected to an underside 42a of the main body 54a of the seat blocking device 18a. The seat blocking device 18a has a hinge 64a, 66a that is provided for pivotably connecting the support member 34a, 36a to the main body 54a. The hinge 64a, 66a has a first connecting element 68a, 70a and a second connecting element 72a, 74a which are pivotably connected to one another. The first connecting element 68a, 70a is fastened to the underside 42a of the main body 54a. Herein the first connecting element 68a, 70a is fastened, by means of a screw connection, to the underside 42a of the main body 54a. The second connecting element 72a, 74a is connected with the support member 34a, 36a. The second connecting element 72a, 74a and the support member 34a, 36a are formed as a one-piece element. The second connecting element 72a, 74a of the hinge 64a, 66a is embodied by the second end of the support member 34a, 36a that is implemented as a plate. Via the hinge 64a, 66a the support member 34a, 36a is pivotably arranged at the underside 42a of the main body 54a and can be pivoted between a storage position and a mounting position. In the storage position the support member 34a, 36a is folded against the underside 42a of the main body 54a. In the mounting position the support element 34a, 36a is folded away from the underside 42a of the main body 54a and a middle part of the support member 34a, 36a is arranged at an angle to the table area 56a. The bent-off flap 62a is oriented essentially parallel to the table area 56a in the mounting position of the support member 34a, 36a. In the mounting position the bent-off flap 62a protrudes beyond a lateral side of the main body 54a. Thereby the bent-off flap 62a is arranged under the respective armrest element 12a, 14a in the mounted state.

The support member 34a can be locked in the mounting position. For locking the support member 34a in the mounting position and in the storage position the seat blocking device 18a has a locking unit 76a. The locking unit 76a locks the support member 34a in the mounting position. By means of the locking unit 76a, the support member 34a is advantageously locked in the mounting position, thus the form fit member 20a is prevented from moving relative to the main body 54a and it is easy for a person to connect the seat blocking device 18a to the armrest element 12a by the form fit member 20a. For locking the support member 34a in the storage position and in the mounting position, the locking unit 76a comprises a locking plate 78a. The locking plate 78a is arranged at a rear side of the main body 54a. The locking plate 78a is connected to the main body 54a by a screw connection. In general it is also possible that the locking plate 78a is integrally formed with the main body 54a. The locking plate 78a extends from the main body 54a downwards away from the table area 56a. The locking plate 78a protrudes beyond the underside 42a of the main body 54a. The locking plate 78a has two locking holes 80a, 82a. The first locking hole 80a is provided for locking the support member 34a in the storage position. The second locking hole 82a is provided for locking the support element 34a in the mounting position. The locking unit 76a further comprises a locking element 84a. The locking element 84a is constructed as a locking pin. The locking unit 76a comprises a casing 86a in which the locking element 84a is arranged. The casing 86a is mounted to the side of the support member 34a facing the back of the main body 54a and the locking plate 78a. The casing 86a has a cavity in which the locking element 84a is movably affixed. The locking unit 76a comprises a spring element which is provided for applying a holding force onto the locking element 84a and is not further shown. To this purpose the locking element 84a is coupled with the spring element. The holding force applied onto the locking element 84a by the spring element forces the locking element 84a into a locking position. In the locking position the locking element 84a extends towards the locking plate 78a. In the locking position the locking element 84a extends beyond a wall of the locking plate 78a facing the support member 34a. In the storage position of the support member 34a, the locking element 84a is aligned with the first locking hole 80a of the locking plate 78a. The locking element 84a is moved into the first locking hole 80a by the holding force applied by the spring element. Hence the locking element 84a is in a form fit with the locking plate 78a, and the support member 34a which the locking element 84a is affixed to is fixed to the main body 54a which the locking plate 78a is affixed to. In the mounting position of the support member 34a, the locking element 84a is aligned with the second locking hole 82a of the locking plate 78a. The locking element 84a is moved into the second locking hole 82a by the holding force applied by the spring element. Hence the locking element 84a is arranged in a form fit with the locking plate 78a, and the support member 34a which the locking element 84a is affixed to is, in the mounting position, fixed to the main body 54a which the locking plate 78a is affixed to. To unlock the locking element 84a from one of the locking holes 80a, 82a of the locking plate 78a, the locking element 84a has a head 88a which is provided so that a person can grip the locking element 84a. The head 88a of the locking element 84a is arranged at an end of the locking element 84a opposing the end that is extended towards the locking plate 78a. To unlock the locking element 84a from either of the locking holes 80a, 82a of the locking plates 78a, a person can grip the locking element 84a by its head 88a and move it against the holding force of the spring element out of the respective locking hole 80a, 82a. Then the support member 34a can be moved into the other position, wherein the locking element 84a automatically moves into the respective locking hole 80a, 82a according to the respective position. The other support member 36a is implemented accordingly and a similar locking unit 90a locks the support member 36a in the two positions. The other support member 36a is arranged at the underside 42a of the main body 54a in a mirrored fashion to a middle axis of the main body 54a.

In general it is also thinkable that the seat blocking device 18a has several support members that connect one form fit member 20a, 22a to the underside of the main body 54a. These several support members could be embodied smaller and therefore lighter. It is also thinkable that the support member 34a, 36a which is built as a plate features holes in its middle part for weight optimization.

The armrest elements 12a, 14a of the aircraft passenger seat 10a each comprise the form fit member 28a, 30a. Hereinafter only one armrest element 12a and its form fit member 28a are described. The following description can be used for the other armrest element 14a and its form fit member 30a as well. The form fit member 28a of the armrest element 12a is located at the underside 32a of the armrest element 12a. The form fit member 28a of the armrest element 12a is designed as a guiding member. The form fit member 28a is fixed to the underside 32a of the armrest element 12a via a screw connection. In general it is also thinkable that the form fit member 28a is fixed to the underside 32a of the armrest element 12a via another method the person skilled in the art deems suitable, such as a glue connection or a form fit connection. In general it is also thinkable that the form fit member 28a and the armrest element 12a are implemented as a one-piece element. The form fit member 28a is provided to enclose the respective form fit member 20a of the seat blocking device 18a. The form fit member 28a has a locking direction in which it is connected to the respective form fit member 20a of the seat blocking device 18a, said locking direction being oriented parallel to a main extension of the corresponding armrest element 12a. A main extension of the form fit member 28a is therefore parallel to the main extension of the respective armrest element 12a. The form fit member 28a has a main cavity 92a extending in the main extension of the form fit member 28a. The main cavity 92a is provided so that the wide part 60a of the respective form fit member 20a of the seat blocking device 18a can be located in it for the form fit. On a bottom the form fit member 28a has an opening 94a extending alongside the main extension of the form fit member 28a. The opening 94a is provided so that the slim part 58a of the respective form fit member 20a of the seat blocking device 18a can be located in it. The main cavity 92a and the opening 94a are open towards a front of the form fit member 28a. The front of the form fit member 28a is oriented towards the front of the armrest element 12a. The front of the armrest element 12a is oriented away from the backrest 50a. For a positive fit connection between the form fit member 28a of the armrest element 12a and the corresponding form fit member 20a of the seat blocking device 18a, the form fit member 20a of the seat blocking device 18a is inserted into the main cavity 92a and the opening 94a of the respective form fit member 28a of the armrest element 12a in the locking direction, from the front. If the form fit member 20a of the seat blocking device 18a is completely inserted into the respective form fit member 28a of the armrest element 12a, the seat blocking device 18a is mounted onto the armrest element 12a. For mounting the seat blocking device 18a both form fit members 20a, 22a of the seat blocking device 18a are inserted into their respective form fit members 28a, 30a of the armrest element 12a simultaneously.

To lock the seat blocking device 18a onto the armrest elements 12a, 14a and prohibit an accidental slipping free of the seat blocking device 18a, the aircraft passenger seat device has two locking devices 96a, 98a. Each locking device 96a, 98a is assigned to one connected pair of form fit members 20a, 22a, 28a, 30a. The locking devices 96a, 98a are integrated into the respective form fit members 20a, 22a, 28a, 30a of the seat blocking device 18a and the armrest element 12a, 14a. The locking devices 96a, 98a are provided to connect the respective form fit member 20a, 22a of the seat blocking device 18a with the corresponding form fit member 28a, 30a of the armrest element 12a, 14a. Hereinafter one locking device 96a and the form fit members 20a, 28a which the locking device 96a is integrated into are described. The following description also applies to the other locking device 98a and the form fit members 22a, 30a the locking device 98a is integrated into. The locking device 98a has a locking pin 100a. The locking pin 100a is affixed in a cavity in the form fit member 20a of the seat blocking device 18a. The locking pin 100a is arranged slidably in the cavity. The cavity and therefore the locking pin 100a are arranged in a perpendicular fashion to the main extension of the form fit member 20a of the seat blocking device 18a. In a locking position the locking pin 100a extends beyond the wide part 60a of the form fit member 20a towards an upper wall 102a of the main cavity 92a of the form fit member 28a. In a locking position the locking pin 100a extends beyond the upper wall 102a of the main cavity 92a of the form fit member 28a. To receive the locking pin 100a and form a positive fit with it, the form fit member 20a of the armrest element 12a has a locking hole 104a in the upper wall 102a of the main cavity 92a of the form fit member 28a. The locking hole 104a and the locking pin 100a of the locking device 96a are aligned when the form fit members 20a, 22a of the seat blocking device 18a and the form fit members 28a, 30a of the armrest elements 12a, 14a, and therefore the seat blocking device 18a and the armrest elements 12a, 14a themselves are in a correctly mounted position. The locking device 96a comprises a not shown spring element which is provided for applying a holding force onto the locking pin 100a. To this purpose the locking pin 100a is coupled with the spring element. The holding force applied onto the locking pin 100a by the spring element forces the locking pin 100a into the locking position.

To unlock the locking pin 100a from the locking hole 104a, the locking pin has a head 106a which is provided so that a person can grip the locking pin 104a. The head 106a of the locking pin 100a is arranged at an end of the locking pin 100a opposing the end that is extended towards the upper wall 102a of the main cavity 92a of the form fit member 28a. The head 106a of the locking pin 100a extends beyond the bent-off flap 62a of the respective support member 34a. To this purpose the bent-off flap 62a of the respective support member 34a has an opening 108a through which the head 106a of the locking pin 100a sticks out. To unlock the locking pin 100a from the locking hole 104a, a person can grip the locking pin 100a by its head 106a and move it against the holding force of the spring element out of the locking hole 104a. If the locking pin 100a of the locking device 96a is in the unlocked position, the locking device 96a is unlocked and the respective form fit members 20a, 28a of the armrest element 12a and the seat blocking device 18a can be moved relative to one another. When both locking devices 96a, 98a are unlocked, the form fit members 20a, 22a of the seat blocking device 18a can be moved out of the form fit members 28a, 30a of the armrest elements 12a, 14a and so the seat blocking device 18a can be removed from the armrest elements 12a, 14a and the aircraft passenger seat 10a. In an assembly of the seat blocking device 18a the locking pins 100a of the locking devices 96a, 98a automatically move into the respective locking hole 104a in the upper wall 102a of the main cavity 92a of the form fit member 28a, 30a due to the holding force the spring element applies. Hence a correctly mounted position of the seat blocking device 18a on the armrest elements is easily achieved.

In general it would also be possible to mount the form fit members 28a, 30a of the armrest elements 12a, 14a not to the underside 32a of the armrest elements 12a, 14a, but to the side or at the front of the armrest elements 12a, 14a. The form fit members 28a, 30a would then have to be adapted accordingly. The respective form fit members 20a, 22a of the seat blocking device 18a and the support elements 34a, 36a that connect the form fit members 20a, 22a to the main body 54a of the seat blocking device 18a would need to be adapted accordingly as well. In general it is also thinkable that the configuration of the form fit members 20a, 22a of the seat blocking device 18a and the form fit members 28a, 30a of the armrest elements 12a, 14a is reversed and the form fit members 20a, 22a of the seat blocking device 18a enclose the respective form fit members 28a, 30a of the armrest elements 12a, 14a in a mounted state.

FIGS. 5 to 13 show five further embodiments of the invention. The following description and the figures are essentially restricted to the differences between the exemplary embodiments, wherein regarding equally denominated components, especially regarding components with the same reference numeral, the figures and/or description from the other exemplary embodiments, in particular of FIGS. 1 to 4 may be considered. For distinguishing the exemplary embodiments, the letter a has been added to the reference numerals of the exemplary embodiment of FIGS. 1 to 4, whereas, in the exemplary embodiments of FIGS. 5 to 13 the letter a has been replaced by the letters b to f.

FIG. 5 shows a second embodiment of an inventive aircraft passenger seat device. The aircraft passenger seat device comprises an aircraft passenger seat which is only partly shown. The aircraft passenger seat comprises two armrest elements 12b, 14b. The armrest elements 12b, 14b are provided to delimit a seating area 16b of the aircraft passenger seat. The aircraft passenger seat device comprises a seat blocking device 18b. The seat blocking device 18b is provided for blocking the seating area 16b of the aircraft passenger seat. In a mounted state the seat blocking device 18b blocks the seating area 16b of the respective aircraft passenger seat. The seat blocking device 18b has a main body 54b. The seat blocking device 18 is designed to be connected to the armrest elements 12b, 14b by a toolless form fit. To connect the seat blocking device 18b to the armrest elements 12b, 14b, no tools are required. The seat blocking device 18b is designed to be connected to the armrest elements 12b, 14b by a screw-less form fit. The main body 54b of the seat blocking device 18b is essentially constructed similarly to the one from the first embodiment of the FIGS. 1 to 4. In distinction from the first embodiment the main body 54b has form fit members 110b integrated into the underside 42b. The form fit members 110b are constructed as cavities that are oriented in a lateral direction 46b and constitute an undercut. To connect the main body 54b to the armrest elements 12b, 14b, the seat blocking device 18b comprises four support members 34b, 36b. The support members 34b, 36b are constructed different from the ones from the first embodiment. In FIG. 5 only one support element 34b, 36b per armrest element 12b, 14b is shown. The support elements 34b, 36b are implemented as foldable legs. The support elements 34b, 36b are each connected to the seat blocking device 18b via a form fit. Hereinafter just one support member 34b of the seat blocking device 18b is described. The following description can also be used for the other support member 36b of the seat blocking device 18b. The support member 34b is embodied by three flat elements 112b, 114b, 116b. The three flat elements 112b, 114b, 116b are arranged in a line. The first flat element 112b is pivotably connected to the second flat element 114b and the second flat element 114b is pivotably connected to the third flat element 116b. Thus the support member 34b can be folded. The first flat element 112b comprises a form fit member 118b to connect the support member 34b to the main body 54b of the seat blocking device 18b. The form fit member 118b is built as a bulge that is provided to engage with the form fit member 110b of the main body 54b. The third flat element 116b comprises a form fit member 20b that is provided for a connection with the respective armrest element 12b. The form fit member 20b that is provided to be connected with the armrest element 12b is implemented as a bulge corresponding to the one that the first flat element 112b comprises for connecting the support element 34b to the main body 54b.

The armrest elements 12b, 14b each comprise two form fit members 28b, 30b. In general it is also thinkable that the armrest elements 12b, 14b comprise another number of form fit members 28b, 30b. The form fit members of the armrest element 12b, 14b are formed as cavities with an undercut. The form fit members 28b, 30b are located at an underside 32b of the armrest element 12b, 14b. The form fit members 28b, 30b have a locking direction that is oriented transversely to a main extension of said armrest element 12b, 14b. The form fit members 28b, 30b are formed integrally into the underside 32b of the respective armrest element 12b, 14b. In general it is also thinkable that the form fit members 28b, 30b are embodied by a separate element which is then connected to the underside 32b of the armrest element 12b, 14b. To mount the seat blocking device 18b to the armrest elements 12b, 14b of the aircraft passenger seat, the support members 34b, 36b are connected to the main body 54b, and then the support members 34b, 36b are connected, by their form fit members 20b, 22b, to the corresponding form fit members 28b, 30b of the armrest elements 12b, 14b.

FIGS. 6 to 8 show a third embodiment of an inventive aircraft passenger seat device.

The aircraft passenger seat device comprises an aircraft passenger seat 10c which is only partly shown. The aircraft passenger seat comprises two armrest elements 12c, 14c. The armrest elements 12c, 14c are provided to delimit a seating area 16c of the aircraft passenger seat 10c. The aircraft passenger seat device comprises a seat blocking device 18c. The seat blocking device 18c is provided for blocking the seating area 16c of the aircraft passenger seat 10c. In a mounted state the seat blocking device 18c blocks the seating area 16c of the respective aircraft passenger seat 10c. The seat blocking device 18c is designed to be connected to the armrest elements 12c, 14c by a toolless form fit. To connect the seat blocking device 18c to the armrest elements 12c, 14c no tools are required. The seat blocking device 18c is designed to be connected to the armrest elements 12c, 14c by a screw-less form fit. The seat blocking device 18c has a main body 54c. The main body 54c of the seat blocking device 18c is constructed essentially similar to the one of the first embodiment of the FIGS. 1 to 4.

The seat blocking device 18c has, in distinction from the first embodiment, only one support member 38c. Additionally the one support member 38c has a slightly different purpose. The support member 38c is provided to brace the main body 54c against a seat bottom 52c of the aircraft passenger seat 10c. The support member 38c is oriented in a lateral direction 48c of the main body 54c. The support member 38c is implemented as a basically flat plate with a bent end. The support member 38c is pivotably mounted to an underside 42c of the main body 54c. To this purpose the seat blocking device 18c comprises a hinge 120c. The hinge 120c has a first connecting element 122c that is fixed to the underside 42c of the main body 54c. The first connecting element 122c is connected to the underside 42c of the main body 54c via a screw connection. A second connecting element 124c which is pivotably connected to the first connecting element 122c is affixed to a first end of the support member 38c. A second end 126c of the support member 38c is bent. The bent second end 126c of the support member 38c is provided to be in contact with the seat bottom 52c of the aircraft passenger seat 10c. In a mounted state the support member 38c conducts forces introduced into the seat blocking device 18c to the seat bottom 52c of the aircraft passenger seat 10c. The support member 38c has a storage position and a usage position. In the storage position the support member 38c is folded against the underside 42c of the main body 54c. In a usage position the support member 38c is pivoted away from the underside 42c of the main body 54c. In the usage position the support member 38c is pivoted by an angle of essentially 90 degrees relative to the underside 42c of the main body 54c. The support member 38c herein extends away from the main body 54c and, in a mounted state, towards the seat bottom 52c of the aircraft passenger seat 10c.

To lock the support member 38c in the usage position and the storage position the seat blocking device features a locking unit 128c. The locking unit 128c is constructed similarly to the locking unit 76a of the first embodiment. The locking unit 128c has two locking plates 130c, 132c, each locking plate having a first locking hole and a second locking hole. The locking plates 130c, 132c are mounted to the underside 42c of the main body 54c. The first locking holes are associated with the storage position. The second locking holes are associated with the usage position. The locking unit 128c further comprises two locking elements 134c, 136c. The locking elements 134c, 136c are designed as locking pins. The locking unit comprises a casing for each locking element 134c, 136c. The casings are mounted to the support member 38c. The locking elements 134c, 136c are embedded in the casings. The casings each have a cavity in which the locking elements 134c, 136c are movably affixed. Each locking element 134c, 136c has a holding force applied onto it. Each holding force is generated by a spring element arranged in the casing and coupled to the respective locking element 134c, 136c. The holding force forces the locking elements 134c, 136c into a locking position. In the locking positions the locking elements 134c, 136c extend to the outside of the respective casing and even beyond the locking plate 130c, 132c. In a storage position of the support member 38c the locking elements 134c, 136c are aligned with the first locking holes of the locking plate 130c, 132c. To this purpose the locking elements 134c, 136c extend into the first locking holes of the locking plate 130c, 132c connecting the support member 38c to the main body 54c in a form fit. Thus the support member 38c is locked in the storage position. In the usage position of the support member 38c the locking elements 134c, 136c are aligned with the second locking holes of the locking plate 130c, 132c. Herein the locking elements 134c, 136c extend into the second locking holes of the locking plate 130c, 132c connecting the support member 38c to the main body 54c in a form fit. Thus the support member 38c is locked in the usage position. Due to the holding forces the locking elements 134c, 136c automatically snap into the locking holes when the locking elements 134c, 136c are aligned with the locking holes. To move the locking elements 134c, 136c out of the locking holes, the locking elements 134c, 136c each have a head a person can grip, pulling the locking elements 134c, 136c out of the locking holes against the holding force. In general it would also be possible that the locking unit 128c has only one locking plate 130c and a respective locking element 134c.

To fix the main body 54c of the seat blocking device 18c to the armrest elements 12c, 14c the seat blocking device 18c contains two form fit members 20c, 22c. In general it is also thinkable that the seat blocking device 18c contains more similar form fit members 20c, 22c. The form fit members 20c, 22c of the seat blocking device 18c are provided to position and fix the main body 54c of the seat blocking device 18c to the armrest elements 12c, 14c. Hereinafter only one form fit member 20c is described. The following description also applies to the other form fit member 22c.

The form fit member 20c is constructed as a movable pin. The form fit member 20c is movable in the lateral direction 48c of the main body 54c. To arrange the form fit member 20c at the main body 54c the seat blocking device 18c has a housing 138c. The housing 138c is mounted onto the underside 42c of the main body 54c. The housing 138c has a cavity that is oriented in the lateral direction 48c of the main body 54c. The form fit member 20c is movably located in the cavity. The housing 138c has an opening at its bottom that opens the cavity partially. An operating element 140c is connected to the form fit member 20c and extends through the opening at the bottom of the housing 138c. The operating element 140c extends through the opening to the outside of the housing 138c so that a person can move the form fit member 20c by moving the operating element 140c. Via the operating element 140c the form fit member 20c can be moved between a locking position and an unlocking position. In the unlocking position the form fit member 20c is completely arranged inside the cavity. In a locking position the form fit member 20c is moved partially outside the housing and protrudes in the lateral direction 48c beyond the main body 54c of the seat blocking device 18c.

For connecting the seat blocking device 18c to the armrest elements 12c, 14c, each of the armrest elements 12c, 14c features a form fit member 28c, 30c. The form fit members 28c, 30c of the armrest elements 12c, 14c are each embodied by walls of a cavity 142c, 144c. The cavities 142c, 144c that form the form fit members 28c, 30c of the armrest elements 12c, 14c are located at side walls of the armrest elements 12c, 14c facing the seating area 16c of the aircraft passenger seat 10c. In a mounted state the form fit members 20c, 22c of the seat blocking device 18c are located in the cavity 142c, 144c forming the respective form fit members 28c, 30c of the armrest elements 12c, 14c.

The aircraft passenger seat device has a locking indicator device 146c. The locking indicator device 146 is provided to indicate to a person, in particular a crew member, whether the seat blocking device 18c is properly mounted. The locking indicator device 146c is integrated into the form fit connection between the form fit members 20c, 22c of the seat blocking device 18c and the form fit members 28c, 30c of the armrest elements 12c, 14c. The cavities 142c, 144c that form the form fit members 28c, 30c of the armrest elements 12c, 14c are designed as a through-hole. The cavities 142c, 144c that form the form fit members 28c, 30c of the armrest elements 12c, 14c reach from one lateral side of the respective armrest element 12c, 14c to another lateral side of the respective armrest element 12c, 14c. The cavities 142c, 144c that form the form fit members 28c, 30c are colored, at least in an area facing away from the seat blocking device 18c. The cavities 142c, 144c are preferably colored red. The tops of the form fit members 20c, 22c which are constructed as movable pins have an indicator element 148c. The indicator element 148c is formed in a way such that the top of each form fit member 20c, 22c is colored. Preferably the top of each form fit member 20c, 22c is colored green. In case the seat blocking device 18c is not mounted to the aircraft passenger seat 10c or the form fit members 20c, 22c are not connected correctly to the respective form fit members 28c, 30c, a person looking at the outer lateral side of one of the armrest elements 12c, 14c can see the red area of the respective cavity 142c, 144c. Therefore it is easy for a person, in particular a crew member, to detect whether the seat blocking device 18c is not mounted correctly. If the form fit members 20c, 22c of the seat blocking device 18c are coupled correctly to the respective form fit members 28c, 30c, the indicator element 148c of the locking indicator device 146c, namely the colored top of the respective form fit member 20c, 22c, covers the colored area of the respective cavity and can be seen by a person, in particular a crew member. Thereby a crew member can easily check if the seat blocking device 18c is correctly mounted, namely by checking if the green indicator element 148c can be seen in the respective cavity 142c, 144c. In general it is also thinkable that the locking indicator device 146c is constructed differently, for example separately from the form fit members 20c, 22c, 28c, 30c. It is thinkable that the locking indicator device 146c has a locking indicator element 148c that is constructed as a spring-loaded pin which snaps into a cavity from which it can be seen by a person when the seat blocking device 18c is in a correctly mounted state.

In assembly of the seat blocking device 18c onto the aircraft passenger seat 10c, the support member 38c is initially moved from the storage position into the usage position by first unlocking the locking unit 128c via moving the locking elements 134c, 136c out of the first locking holes and then pivoting the support member 38c in the usage position. If the support member 38c is locked in the usage position by the locking unit 128c, the form fit members 20c, 22c of the seat blocking device 18c are arranged with the form fit members 28c, 30c of the armrest elements 12c, 14c. If all the respective form fit members 20c, 22c, 28c, 30c are aligned correctly, the form fit members 20c, 22c of the seat blocking device 18c can be moved, via the operating elements 140c, into a locking position in which the form fit members 20c, 22c of the seat blocking device 18c engage with the form fit members 28c, 30c of the armrest elements 12c, 14c. Then the seat blocking device 18c is fully mounted to the aircraft passenger seat 10c.

FIG. 9 and FIG. 10 show a fourth embodiment of an inventive aircraft passenger seat device. The aircraft passenger seat device comprises an aircraft passenger seat which is only partly shown. The aircraft passenger seat comprises two armrest elements 12d, 14d. The armrest elements 12d, 14d are provided to delimit a seating area 16d of the aircraft passenger seat. The aircraft passenger seat device comprises a seat blocking device 18d. The seat blocking device 18d is provided for blocking a seating area 16d of the passenger seat. In a mounted state the seat blocking device 18d blocks the seating area 16d of the respective aircraft passenger seat. The seat blocking device 18d is designed to be connected to the armrest elements 12d, 14d by a toolless form fit. To connect the seat blocking device 18d to the armrest elements 12d, 14d no tools are required. The seat blocking device 18d is designed to be connected to the at least one armrest 12d, 14d element by a screw-less form fit. The FIGS. 9 and 10 only show abstracted and simplified versions of the aircraft passenger seat device.

The seat blocking device 18d has a main body 54d. The main body 54d of the seat blocking device 18d is constructed in a different manner than in the previous embodiments. The main body 54d consists of two elements 44d, 46d. The two elements 44d, 46d of the main body 54d are pivotably connected. The seat blocking device 18d has a hinge which connects the two elements 44d, 46d of the seat blocking device 18d. The two elements 44d, 46d of the main body 54d are essentially constructed similarly. In a storage position the two elements 44d, 46d of the main body 54d can be folded against each other, so that the seat blocking device 18d does not need much storing space. The two elements 44d, 46d are designed to be pivoted into a usage position, in which they are oriented essentially parallel to one another, in an assembly process.

To the purpose of connecting the seat blocking device 18d to the armrest elements 12d, 14d, the seat blocking device 18d has two form fit members 20d, 22d. At each lateral side of one of the two elements 44d, 46d of the main body 54d a form fit member 20d, 22d is arranged. The form fit members 20d, 22d are implemented as hooks. It is thinkable that the form fit members 20d, 22d are connected pivotably to the two elements 44d, 46d of the main body 54d. In that case the form fit members 20d, 22d could be arranged in a storage position and a mounting position. Furthermore the seat blocking device 18d could then have a locking device similar to the ones in the previous embodiments, by which the form fit members 20d, 22d could be locked in the storage position and the mounting position.

To connect the seat blocking device 18d to the aircraft passenger seat the armrest elements 12d, 14d each have a form fit member 28d, 30d. The armrest elements 12d, 14d each have a surface which itself forms the form fit member 28d, 30d of the respective armrest element 12d, 14d, by which the seat blocking device 18d is connected to the armrest elements 12d, 14d. For connecting the form fit members 20d, 22d of the seat blocking device 18d and the form fit members 28d, 30d of the armrest elements in order to mount the seat blocking device 18d to the aircraft passenger seat, the two elements 44d, 46d of the main body 54d have to be positioned in their usage position. Then the form fit members 20d, 22d can be placed over the armrest elements 12d, 14d and moved down so that the form fit members 20d, 22d implemented as hooks engage with the surfaces of the armrest elements 12d, 14d, which themselves form the form fit members 28d, 30d of the armrest elements 12d, 14d. The form fit members 20d, 22d of the seat blocking device 18d enclose a top surface and side surfaces of the armrest elements 12d, 14d, which themselves form the form fit members 20d, 22d.

FIG. 11 shows a fifth embodiment of the inventive aircraft passenger seat device. The aircraft passenger seat device is designed essentially equally to the fourth embodiment. The seat blocking device 18e has a main body 54e. The main body 54e consists of two elements 44e, 46e. The only difference is that form fit members 20e, 22e of a seat blocking device 18e are oriented in a different way. The form fit members 20e, 22e of the seat blocking device 18e open in a mounted state in a lateral direction. The form fit members 20e, 22e of the seat blocking device 18e enclose the top surface and the one side surface facing a seating area 16e of an aircraft passenger seat, and enclose the undersides of the armrest elements 12e, 14e that themselves form their form fit members 28e, 30e.

FIGS. 12 and 13 show a sixth embodiment of the inventive aircraft passenger seat device. The aircraft passenger seat device comprises an aircraft passenger seat which is only partly shown. The aircraft passenger seat comprises two armrest elements 12f only one of which is partly shown in FIG. 12. The aircraft passenger seat device comprises a seat blocking device 18f which is shown in FIG. 12. The seat blocking device 18f has a main body 54f that is built similarly to the one of the fourth or fifth embodiment. The main body 54f consists of two separate elements 44f, 46f which are pivotably connected by a hinge. The seat blocking device 18f is designed to be connected to the armrest elements 12f by a toolless form fit. To the purpose of connecting the seat blocking device 18f to the armrest elements 12f, the seat blocking device 18f has four form fit members 20f, 22f, 24f, 26f. The form fit members 20f, 22f, 24f, 26f are provided to connect the seat blocking device 18f to the armrest elements 12f. The form fit members 20f, 22f, 24f, 26f are embodied as tongues that extend from the main body 54f in a transverse direction. Herein the form fit members 20f, 22f, 24f, 26f are arranged on both lateral sides of the main body 54f as well as one on the front side and one on the rear side. The seat blocking device 18f has two reinforcement braces 150f, 152f that support the main body 54f. The reinforcement braces 150f, 152f are arranged at an underside of the main body 54f. The reinforcement braces 150f, 152f are arranged in an X shape. The seat blocking device 18f has a hinge 154f that connects the reinforcement braces 150f, 152f pivotable to one another. The hinge 154f connects the two reinforcement braces 150f, 152f in their middle. The hinge 154f connects the two reinforcement braces 150f, 152f pivotable to the main body 54f. On each outer end of the reinforcement braces 150f, 152f one form fit member 20f, 22f, 24f, 26f is arranged. The form fit members 20f, 22f, 24f, 26f are connected to the reinforcement braces 150f, 152f. In a storage position the two reinforcement braces 150f, 152f can be folded, so that they are oriented parallel to one another. In a mounting position the reinforcement braces 150f, 152f are oriented in a square angle to one another (as seen in FIG. 12). In the mounting position the reinforcement braces 150f, 152f are locked by locking devices not closer shown. The main body 54f sits on the reinforcement braces 150f, 152f and forces introduced into the main body can be conducted by through the reinforcement braces 150f, 152f into the arm rest elements 12f. The reinforcement braces 150f, 152f braces are built from a composite material such as a carbon fibre reinforced plastic. It is also possible, that the reinforcement braces 150f, 152f braces are built from a light metal such as aluminum. Due to the fact that the reinforcement braces 150f, 152f carry a lot of the load applied on the main body 54f, the main body 54f can be made from not that rigid and light materials such as plastic.

To connect the seat blocking device 18f to the aircraft passenger seat and especially the armrest elements 12f, the armrest elements 12f each have two form fit members 28f. The form fit members 28f of the armrest elements 12f are each formed by walls of a cavity 142f. The cavities 142f that form the form fit members 28f of the armrest elements 12f are located on side walls of the armrest elements 12f, which face a seating area of the aircraft passenger seat. In a mounted state the form fit members 20f of the seat blocking device 18f are located in the cavity 142f forming the respective form fit members 28f of the armrest elements 12f.

REFERENCE NUMERALS 10 aircraft passenger seat
12 armrest element
14 armrest element
16 seating area
18 seat blocking device
20 form fit member (SBD)
22 form fit member (SBD)
24 form fit member (SBD)
26 form fit member (SBD)
28 form fit member (ARE)
30 form fit member (ARE)
32 underside (ARE)
34 support member
36 support member
38 support member
40 hinge (SUPPORT M)
42 underside (SBD)
44 element (SBD)
46 element (SBD)
48 lateral direction
50 backrest
52 seat bottom
54 main body
56 table area
58 slim part
60 wide part
62 bent off flap
64 hinge
66 hinge
68 first connecting element
70 first connecting element
72 second connecting element
74 second connecting element
76 locking unit
78 locking plate
80 locking hole
82 locking hole
84 locking element
86 casing
88 head
90 locking unit
92 main cavity
94 opening
96 locking device
98 locking device
100 locking pin
102 upper wall
104 locking hole
106 head
108 opening
110 form fit members
112 flat element
114 flat element
116 flat element
118 form fit member
120 hinge
122 first connecting element
124 second connecting element
126 second end
128 locking unit
130 locking plate
132 locking plate
134 locking element
136 locking element
138 housing
140 operating element
142 cavity
144 cavity
146 locking indicator device
148 indicator element
150 reinforcement brace
152 reinforcement brace
154 hinge

The invention claimed is:

1. An aircraft passenger seat device comprises an aircraft passenger seat with at least one armrest element which is provided for delimiting a seating area of the aircraft passenger seat, and a seat blocking device which is provided for blocking the seating area of the aircraft passenger seat in a mounted state, the seat blocking device in the mounted state is disposed to make the aircraft passenger seat on which it is mounted unusable for a passenger to sit on, the seat blocking device includes a main body which is provided to be placed above the seating area of the aircraft passenger seat, the main body of the seat blocking device in the mounted state blocks off said seating area of the aircraft passenger seat, wherein the seat blocking device is designed to be connected to the at least one armrest element by a toolless form fit, the at least one armrest element connected to the seat blocking device being still fully usable in the mounted state of the seat blocking device, the at least one armrest element comprises at least one form fit member which is designed to connect the seat blocking device to the aircraft passenger seat and is implemented as a guiding member, wherein the at least one form fit member of the at least one armrest element is located at an underside of the armrest element.

2. The aircraft passenger seat device according to claim 1, wherein the seat blocking device is designed to be connected to the at least one armrest element by a screw-less form fit.

3. The aircraft passenger seat device according to claim 1, wherein the seat blocking device has at least one form fit member which is designed to be connected to an equivalent form fit member of the aircraft passenger seat.

4. The aircraft passenger seat device according to claim 1, wherein the at least one form fit member of the at least one armrest element has a locking direction which is oriented parallel to a main extension of the at least one armrest element.

5. The aircraft passenger seat device at least according to claim 1, wherein the at least one form fit member of the at least one armrest element has a locking direction which is oriented transversely to a main extension of the at least one armrest element.

6. The aircraft passenger seat device according to claim 1, wherein the seat blocking device has at least one support member by which the seat blocking device is connected to the at least one armrest element.

7. The aircraft passenger seat device according to claim 6, wherein the at least one support member is connected to the seat blocking device by a form fit.

8. The aircraft passenger seat device according to claim 6, wherein the seat blocking device has at least one hinge that pivotably connects the at least one support member to an underside of the seat blocking device.

9. The aircraft passenger seat device according to claim 1, wherein the at least one armrest element has a surface which itself forms the form fit member by which the seat blocking device is connected to the at least one armrest element.

10. The aircraft passenger seat device according to claim 1, wherein the seat blocking device consists of at least two elements which are pivotably connected to one another.

11. The aircraft passenger seat device according to claim 10, wherein the at least two elements of the seat blocking device are folded against each other in a storage position and are designed to be pivoted into a usage position, in which they are oriented essentially parallel to one another, in an assembly process.

12. A seat blocking device according to claim 1.

13. An aircraft passenger seat with an aircraft passenger seat device according to claim 1.

14. The aircraft passenger seat device according to claim 1, wherein the at least one armrest element is only pivotable in one plane that is parallel to a plane generated by a seating direction and a vertical direction.

15. The aircraft passenger seat device according to claim 1, wherein the at least one armrest element is oriented parallel to a seating direction in the mounted state of the seat blocking device.

16. The aircraft passenger seat device according to claim 1, wherein the seat has two armrest elements and the seat blocking device is only connected to the seat via the two armrest elements.

17. The aircraft passenger seat device according to claim 16, wherein the main body spans the seating area between the two armrest elements in a lateral direction, the lateral direction is transverse to a seating direction.

18. The aircraft passenger seat device according to claim 1, wherein the seat has two armrest elements, wherein the main body of the seat blocking device has an underside which is disposed in the mounted state facing the seating area, the seat blocking device further includes a support member mounted to the underside of the main body at a location centered between the two armrest elements, the support member has a flat plate shape with a bent end, the support member in a usage condition extends away from the main body and the bent end of the support member contacts a seat bottom to brace the main body of the seat blocking device in the mounted state against the seating area, the support member in a storage condition is folded against the underside of the main body.

19. An aircraft passenger seat device comprises an aircraft passenger seat with at least one armrest element which is provided for delimiting a seating area of the aircraft passenger seat, and a seat blocking device which is provided for blocking the seating area of the aircraft passenger seat in a mounted state, the seat blocking device in the mounted state is disposed to make the aircraft passenger seat on which it is mounted unusable for a passenger to sit on, the seat blocking device includes a main body which is provided to be placed above the seating area of the aircraft passenger seat, the main body of the seat blocking device in the mounted state blocks off said seating area of the aircraft passenger seat, wherein the seat blocking device is designed to be connected to the at least one armrest element by a toolless form fit, the at least one armrest element connected to the seat blocking device being still fully usable in the mounted state of the seat blocking device, wherein the seat has two armrest elements, wherein the main body of the seat blocking device has an underside which is disposed in the mounted state facing the seating area, the seat blocking device further includes a support member mounted to the underside of the main body at a location centered between the two armrest elements, the support member has a flat plate shape with a bent end, the support member in a usage condition extends away from the main body and the bent end of the support member contacts a seat bottom to brace the main body of the seat blocking device in the mounted state against the seating area, the support member in a storage condition is folded against the underside of the main body.

* * * * *